(12) United States Patent
Hwang

(10) Patent No.: US 12,427,448 B2
(45) Date of Patent: Sep. 30, 2025

(54) SCREEN PANEL FOR REMOVING DEBRIS

(71) Applicant: Blue Whale Screen, Inc., Gyeonggi-do (KR)

(72) Inventor: In Hyung Hwang, Gyeonggi-do (KR)

(73) Assignee: Blue Whale Screen, Inc., Gyeonggi-do (KR)

( * ) Notice: Subject to any disclaimer, the term of this patent is extended or adjusted under 35 U.S.C. 154(b) by 0 days.

(21) Appl. No.: 19/000,954

(22) Filed: Dec. 24, 2024

(65) Prior Publication Data

US 2025/0214003 A1    Jul. 3, 2025

(30) Foreign Application Priority Data

Dec. 28, 2023  (KR) .................. 10-2023-0195088

(51) Int. Cl.
*B01D 29/03* (2006.01)

(52) U.S. Cl.
CPC ........ *B01D 29/03* (2013.01); *B01D 2029/033* (2013.01)

(58) Field of Classification Search
CPC .. B01D 29/00; B01D 29/03; B01D 2029/033; B01D 29/0097; B01D 29/19
See application file for complete search history.

(56) References Cited

FOREIGN PATENT DOCUMENTS

| CN | 114159853 A | * | 3/2022 | ............ B01D 29/03 |
|---|---|---|---|---|
| JP | 1996302651 A | | 11/1996 | |
| KR | 1020080112592 A | | 12/2008 | |
| KR | 102161070 B1 | | 9/2020 | |
| KR | 102371002 B1 | | 4/2022 | |

OTHER PUBLICATIONS

Office Action for Korean Patent Application No. 10-2023-0195088, dated Jun. 19, 2025, 6 pages.

* cited by examiner

*Primary Examiner* — Jacob S. Scott
*Assistant Examiner* — Miraj T. Patel
(74) *Attorney, Agent, or Firm* — Lippes Mathias LLP

(57) ABSTRACT

Proposed is a screen panel for removing debris, the screen panel including a plurality of cylindrical support beams arranged spaced apart from each other, and a plurality of screen bars configured to intersect the plurality of support beams and coupled to the upper portions of the support beams at a predetermined distance from each other, wherein each of the screen bars includes a wedge cross-section part whose width becomes narrower from the top to the bottom, and a vertical flat bar part extending vertically downward from the bottom of the wedge cross-section part, and the support beams have fastening grooves on the upper portions thereof that are concave to correspond to a plurality of vertical flat bar parts and spaced apart from each other.

5 Claims, 4 Drawing Sheets

SCREEN PANEL FOR REMOVING DEBRIS

CROSS REFERENCE TO RELATED APPLICATION

The present application claims priority to Korean Patent Application No. 10-2023-0195088, filed Dec. 28, 2023, the entire contents of which is incorporated herein for all purposes by this reference.

BACKGROUND OF THE INVENTION

Field of the Invention

The present disclosure relates to a screen panel for removing debris.

Description of the Related Art

In general, sewage and wastewater treatment facilities require a treatment process that first filters out a variety of impurities and debris such as floating matter, garbage, driftwood, etc., contained in the wastewater flowing into the facility.

Conventionally, in order to filter out such debris, a comb-shaped screen plate consisting of a number of bars is installed at an angle at the location where sewage and wastewater flows in. The conventional screen plate filters out debris larger than the gaps between the screen bars, and the debris captured by the screen plate is lifted and discharged to the outside by scraping the gap between the screen bars and the upper surface of the screen plate with rakes attached to lifting chains installed on each of the left and right sides of the screen plate that rotate in an endless orbit.

Such a conventional screen plate adopts a sliding through-coupling method, where screen bars are supported by a beam on the back side. Specifically, this type of screen plate is manufactured by forming fastening grooves on the upper surfaces of flat support beams, which are arranged at regular intervals as shown in Patent Document 1. Protrusions on the back sides of screen bars are inserted into the fastening grooves. Accordingly, support beam bodies around the screen bars meet at right angles to the longitudinal direction of the screen bars and the running direction of rake teeth. This design allows hair or wet tissue fiber skeins, primarily composed of polyethylene terephthalate (PET) which is found in large quantities in sewage, to easily wrap around the support beams. As a result, as the rake teeth pass, they cannot cut or scrape off these impurities, but instead compact them around the fastening grooves under the screen bars. This leads to the rake teeth bending or breaking, causing the rake to bounce around at each support beam position. Over time, this increases the blockage of the screen gap before and after the support beams, eventually blocking almost all of the screen plate.

Moreover, screen plates made with this sliding through-coupling method must be machined to ensure that the fastening grooves of the support beams and the protrusions on the back sides of the screen bars that are inserted into them must be cut to a dimension with minimum clearance to prevent the screen bars from wobbling. For long screen plates, this can become increasingly difficult, as two or three workers are required to perform the repetitive penetrating work hundreds of times. In addition, even the smallest machining errors or small molten beads that can occur when laser cutting the support beam may cause the screen bar to become stuck in the fastening groove, halting further work and potentially leading to the entire screen plate being discarded.

DOCUMENTS OF RELATED ART (Patent Document 0001) Korean Patent No. 10-1179243

SUMMARY OF THE INVENTION

Accordingly, the present disclosure has been made keeping in mind the above problems occurring in the related art, and the present disclosure is intended to provide a screen panel for removing debris that facilitates assembly of screen bars and support beams while preventing screen gaps from being clogged by debris.

In order to achieve the above objective, according to an embodiment of the present disclosure, a screen panel is provided for removing debris, the screen panel including: a plurality of cylindrical support beams arranged spaced apart from each other; and a plurality of screen bars configured to intersect the plurality of support beams and coupled to the upper portions of the support beams at a predetermined distance from each other wherein each of the screen bars may include a wedge cross-section part whose width becomes narrower from the top to the bottom; and a vertical flat bar part extending vertically downward from the bottom of the wedge cross-section part, and the support beams may have fastening grooves on the upper portions thereof that are concave to correspond to a plurality of vertical flat bar parts and spaced apart from each other.

According to an embodiment, the screen panel may further include a pair of side frames, the side frames being respectively connected to one end and the other end of the plurality of support beams to connect the support beams to each other.

According to an embodiment, the screen panel may further include a debris guide provided at one end of the plurality of screen bars and fixed to one portion of the pair of side frames.

According to an embodiment, the plurality of screen bars connected to the debris guide may include a tapered part that is inclined toward the debris guide.

According to an embodiment, the debris guide may include an installation groove formed concavely to correspond to the vertical flat bar part extending from the bottom of the tapered part.

The features and advantages of the present disclosure will become more apparent from the following detailed description based on the accompanying drawings.

Prior to this, terms or words used in this specification and claims should not be construed in their usual, dictionary meaning, and must be interpreted with meaning and concept consistent with the technical idea of the present disclosure on the basis of the principle that the inventor can define terminology appropriately to explain his or her invention in the best way possible.

According to an embodiment of the present disclosure, the screen bars and support beams can be more easily assembled.

According to an embodiment of the present disclosure, production costs can be greatly reduced.

According to an embodiment of the present disclosure, by preventing debris such as hair or fibers from being entangled in the support beams, the problem of screen gaps being blocked can be fundamentally solved.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
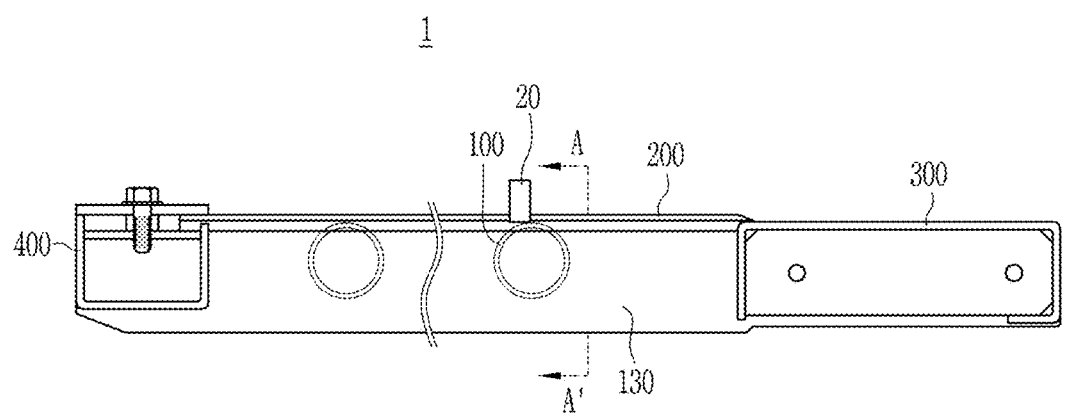
FIG. 1 is a right-side view illustrating a screen panel for removing debris according to an embodiment from the right side.

The objectives, advantages, and features of the present disclosure will become more apparent from the following detailed description and preferred embodiments taken in conjunction with the accompanying drawings, but the present disclosure is not necessarily limited thereto. In addition, in describing the present disclosure, if it is determined that a detailed description of related known technology may unnecessarily obscure the gist of the present disclosure, the detailed description will be omitted.

It should be noted that, in assigning reference numerals to components in the drawings, identical components are assigned the same reference numerals as much as possible even if they are shown in different drawings, and similar reference numbers are assigned to similar components.

Terms used to describe an embodiment of the present disclosure are not intended to limit the disclosure. It should be noted that singular expressions include plural expressions unless the context clearly dictates otherwise.

In this document, expressions such as "have", "may have", "include", or "may include" refer to the presence of the corresponding feature (e.g., a numerical value, function, operation, or component such as a part), and do not exclude the presence of additional features.

Terms such as "one", "other", "another", "first", "second", etc., used to distinguish one component from another component, and the components are not limited by the terms.

Hereinafter, an embodiment of the present disclosure will be described in detail with reference to the attached drawings.

Figure 2:
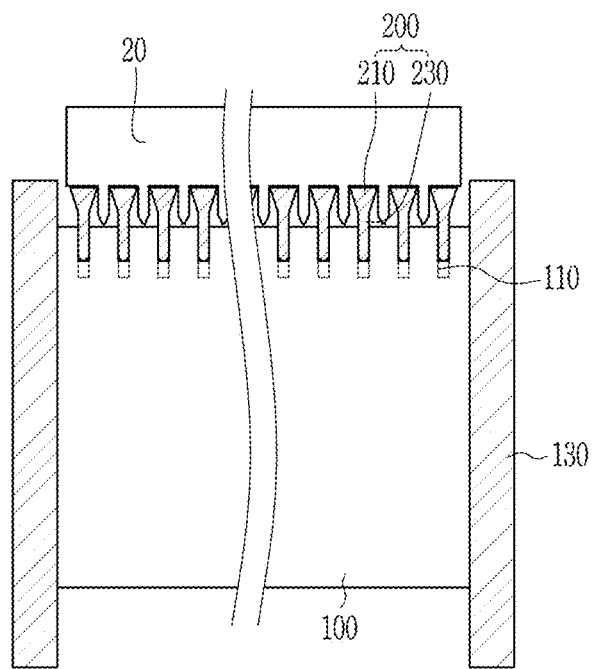
FIG. 2 is a cross-sectional view taken along A-A' in FIG. 1.
Figure 3:
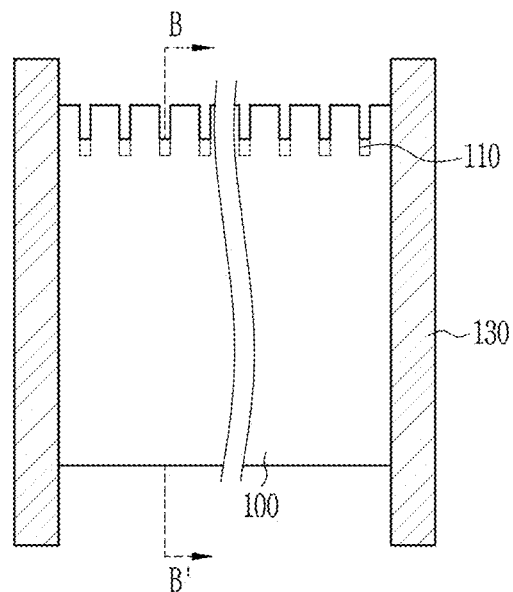
FIG. 3 is a cross-sectional view illustrating only a support pipe shown in FIG. 2.
Figure 4:
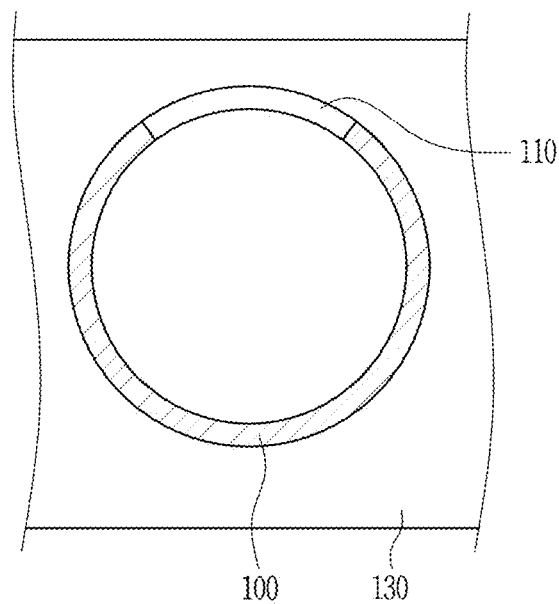
FIG. 4 is a cross-sectional view taken along B-B' in FIG. 3.
Figure 5:
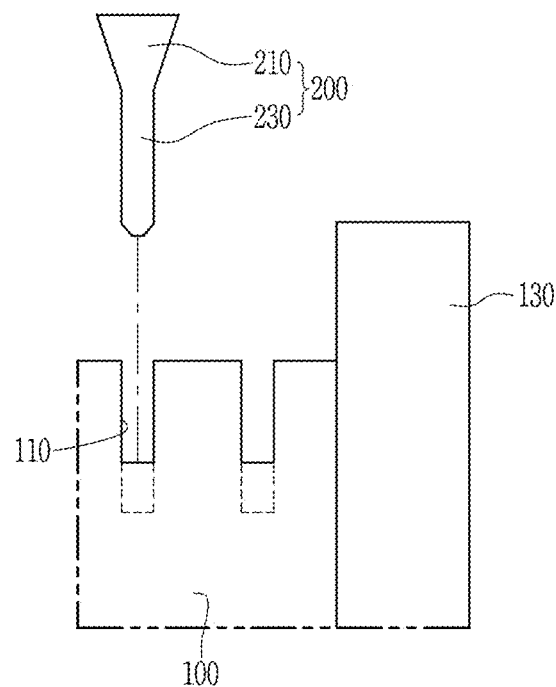
FIG. 5 is an exploded view illustrating the upper portion of a support beam partially enlarged and a screen bar disassembled in a screen panel for removing debris according to an embodiment.
Figure 6:
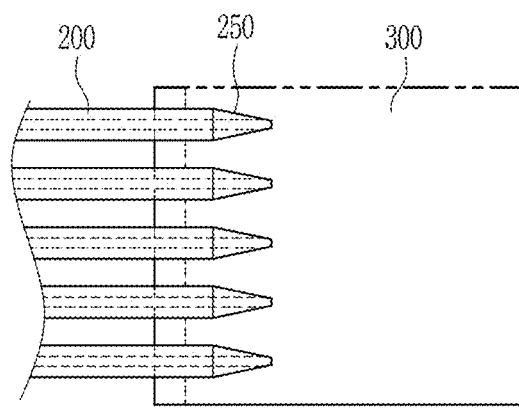
FIG. 6 is an enlarged plan view of a connection portion of a screen bar and a debris guide in a screen panel for removing debris according to an embodiment.
Figure 7:
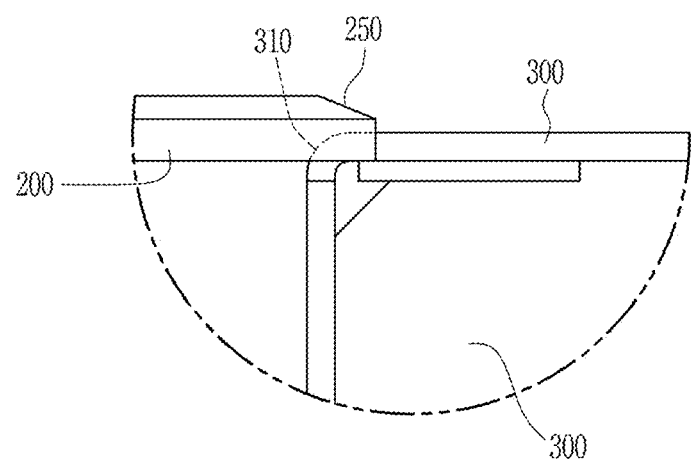
FIG. 7 is a right-side view illustrating FIG. 6 from the right side.

FIG. 1 is a right-side view illustrating a screen panel for removing debris according to an embodiment from the right side; FIG. 2 is a cross-sectional view taken along A-A' in FIG. 1; FIG. 3 is a cross-sectional view illustrating only a support pipe shown in FIG. 2; FIG. 4 is a cross-sectional view taken along B-B' in FIG. 3; FIG. 5 is an exploded view illustrating the upper portion of a support beam partially enlarged and a screen bar disassembled in a screen panel for removing debris according to an embodiment; FIG. 6 is an enlarged plan view of a connection portion of a screen bar and a debris guide in a screen panel for removing debris according to an embodiment; and FIG. 7 is a right-side view illustrating FIG. 6 from the right side.

Referring to FIGS. 1 to 7, a screen panel 1 for removing debris of the present disclosure may include a support beam 100, a screen bar 200, a debris guide 300, and a clamp part 400.

The support beam 100 may support the screen bar 200. A plurality of support beams 100 may be provided, and the support beams 100 may be cylindrical beams arranged to be spaced apart from each other. The support beams 100 may be positioned side by side on the same horizontal line. Since the support beam 100 is cylindrical and has a curved outer circumference, even if debris such as hair or fiber skeins that pass through the gap between the screen bars 200 are wrapped around the upper surface of the support beam 100, the debris may be easily removed by the movement of the teeth of a rake part 20. The support beams 100 may be provided with a plurality of concave fastening grooves 110 at the upper portions thereof.

The fastening groove 110 may be provided in a curved shape in the vertical direction along the upper circumference of the cylindrical support beam 100. The fastening grooves 110 may be spaced apart from each other at regular intervals along the longitudinal direction of the support beams 100.

The plurality of support beams 100 may be connected to a side frame 130 at one end and the other end thereof. The side frame 130 is composed of a pair, and may fixedly connect the support beams 100.

The screen bars 200 may contact and filter out debris. In addition, the rake part 20, rotatable by a driving means (not shown), may be installed for scraping and removing debris when the debris contained in wastewater does not pass through the gap between the screen bars 200 and gets caught on the screen bars 200. A plurality of screen bars 200 may be provided and the plurality of screen bars 200 may be coupled to the upper portion of the plurality of support beams 100 at a predetermined distance from each other. That is, the plurality of screen bars 200 may be coupled to the fastening grooves 110 provided on the upper portion of the plurality of support beams 100. The screen bar 200 may include a wedge cross-section part 210, a vertical flat bar part 230, and a tapered part 250.

The wedge cross-section part 210 may contact and filter out debris. The wedge cross-section part 210 is provided on the upper surface of the screen bar 200, and the thickness thereof reduces from the top to the bottom, thereby preventing debris from being caught between the screen bars 200.

The vertical flat bar part 230 is fastened to the fastening groove 110 to couple the screen bar 200 to the support beam 100. The vertical flat bar part 230 is provided at the lower portion of the screen bar 200 and may extend vertically downward from the bottom of the wedge cross-section part 210. The vertical flat bar part 230 is formed straight, and the vertical flat bar part 230 may be simply coupled to the fastening groove 110 by pressing the screen bar 200 from the top to the bottom with the worker's hand. Thus, the screen bar 200 of the present disclosure may be quickly and easily assembled to the support beam 100 by a single worker, thereby significantly reducing production costs and time. In addition, since the screen bar 200 is pressed to a certain extent in the direction of the support beam 100 by the rake part 20, the screen bar 200 may be stably fixed to the support beam 100 without having to forcefully couple the screen bar 200 to the support beam 100.

The tapered part 250 may be provided on the debris guide 300 side of the screen bar 200. In addition, the tapered part 250 may be formed to be inclined at the top and each side thereof so that the length of the circumference becomes shorter toward the end.

The tapered part 250 may guide the reverse running of the rake part 20 while coupled to the debris guide 300. That is, the rake part 20 normally runs from the other side (lower side) to one side (upper side) of the screen bar 200, and may run in reverse, moving from one side (upper side) to the other side (lower side) in the opposite direction of its usual operation in situations such as machine maintenance. In this case, the tapered part 250 may guide the reverse running path of the teeth of the rake part 20 to correct left-right width direction wobble and guide the teeth to stably enter the gap between the screen bars 20.

The debris guide 300 may serve to help discharge debris such that the debris transported and raised by the rake part 20 slide up on the upper surface thereof. The debris guide 300 may be provided at one end of the plurality of screen bars 200. The debris guide 300 may be provided at one end located on the upper side of both ends of the plurality of screen bars 200. The debris guide 300 may be coupled to the screen bar 200 by the vertical flat bar part 230 beneath the tapered part 250 provided at one end of the screen bar 200. That is, the debris guide 300 is provided with an installation groove 310 on one side thereof that is concavely formed to correspond to the vertical flat bar part 230 beneath the tapered part 250, and the screen bar 200 may be coupled to the debris guide 300 by fitting the vertical flat bar part 230 into the installation groove 310.

As described above, according to the screen panel 1 for removing debris of the present disclosure, when assembling the screen bar 100 with the support beam 200, a non-welding mechanical fastening method is used, which is simpler and easier to assemble than the conventional through-fastening method, so that the assembly time of the screen bar 100 and the support beam 200 may be reduced to $\frac{1}{3}$ to $\frac{1}{10}$ compared to the conventional method, and assembly may be done easily by one worker. Furthermore, the screen panel 1 for removing debris of the present disclosure makes it possible to reduce working time and reduce production costs to a greater extent than in the conventional case when assembling long screen plates.

Above, the present disclosure has been described in detail through specific embodiments. The embodiments are for specifically explaining the present disclosure, and the present disclosure is not limited thereto. It is obvious to those skilled in the art that various changes and modifications to the embodiments are possible within the scope and spirit of the present disclosure, and it is also obvious that such changes and modifications fall within the scope of the appended patent claims.

What is claimed is:

1. A screen panel for removing debris, the screen panel comprising:
    a plurality of cylindrical support beams arranged spaced apart from each other, and
    a plurality of screen bars configured to intersect the plurality of support beams and coupled to the upper portions of the support beams at a predetermined distance from each other,
    wherein each of the screen bars comprises:
    a wedge cross-section part whose width becomes narrower from the top to the bottom; and
    a vertical flat bar part extending vertically downward from the bottom of the wedge cross-section part, and
    the support beams have fastening grooves on the upper portions thereof that are concave to correspond to a plurality of vertical flat bar parts and spaced apart from each other.

2. The screen panel of claim 1, further comprising:
    a pair of side frames, the side frames being respectively connected to one end and the other end of the plurality of support beams to connect the support beams to each other.

3. The screen panel of claim 2, further comprising:
    a debris guide provided at one end of the plurality of screen bars and fixed to one portion of the pair of side frames.

4. The screen panel of claim 3, wherein the plurality of screen bars connected to the debris guide includes a tapered part that is inclined toward the debris guide.

5. The screen panel of claim 4, wherein the debris guide includes an installation groove formed concavely to correspond to the vertical flat bar part extending from the bottom of the tapered part.

* * * * *